US008677184B2

(12) United States Patent
Astigarraga et al.

(10) Patent No.: US 8,677,184 B2
(45) Date of Patent: Mar. 18, 2014

(54) SYSTEM, METHOD, AND COMPUTER PROGRAM PRODUCT FOR GATHERING DEVICE INFORMATION TO ENABLE IDENTIFICATION OF POTENTIAL RISKS IN A NETWORK ENVIRONMENT

(75) Inventors: Tara Astigarraga, Vail, AZ (US); Louie A. Dickens, Tucson, AZ (US); Nancy V. Ryson, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/985,278

(22) Filed: Jan. 5, 2011

(65) Prior Publication Data

US 2012/0173934 A1    Jul. 5, 2012

(51) Int. Cl.
*G06F 11/00* (2006.01)
(52) U.S. Cl.
USPC .................................. 714/37; 714/43; 714/57
(58) Field of Classification Search
USPC ................................................ 714/37, 43, 57
See application file for complete search history.

(56) References Cited

U.S. PATENT DOCUMENTS

| 7,426,554 B2 * | 9/2008 | Kennedy ........................ 709/223 |
| 7,673,031 B1 | 3/2010 | Jalagam et al. |
| 7,685,269 B1 | 3/2010 | Thrasher et al. |
| 7,702,655 B1 | 4/2010 | Panelli et al. |
| 2005/0060124 A1 | 3/2005 | Chen et al. |
| 2012/0039331 A1 * | 2/2012 | Astigarraga et al. .......... 370/389 |

* cited by examiner

*Primary Examiner* — Charles Ehne
(74) *Attorney, Agent, or Firm* — Zilka-Kotab, PC (57) ABSTRACT

According to one embodiment, a system for creating a list of related defects in a network environment includes a processor, and a computer readable storage medium having computer readable program code embodied therewith. The computer readable program code includes computer readable program code that, when executed by the processor, causes the system to acquire a device list related to devices in multiple paths of a network, computer readable program code that, when executed by the processor, causes the system to query one or more information sources using the device list to retrieve defect data from the one or more information, sources, computer readable program code that, when executed by the processor, causes the system to create a list of related defects based on the retrieved defect data, and computer readable program code that, when executed by the processor, causes the system to output the list of related defects.

20 Claims, 4 Drawing Sheets

SYSTEM, METHOD, AND COMPUTER PROGRAM PRODUCT FOR GATHERING DEVICE INFORMATION TO ENABLE IDENTIFICATION OF POTENTIAL RISKS IN A NETWORK ENVIRONMENT

BACKGROUND

The present invention relates to gathering device information on a network, and more particularly, to a system, method, and computer program product for gathering device information to identify potential risks in a network environment.

As network, and particularly storage area network (SAN), fabrics increase in complexity, it often occurs that multiple switch code-streams and even diverse network devices may coexist in the same fabric. Some legacy switch products are not supported as code-streams move forward requiring network administrators and/or administrator teams to track, monitor, and update equipment at different paces. The co-existence of multiple code-streams in the same network fabric, increases the probability that problems will be encountered as host to target communication may traverse multiple devices, code paths, and network switch products. With complex network environments, it becomes extremely difficult for users to understand and plan for defects and the impact that defects will have on the network environment and network performance.

BRIEF SUMMARY

According to one embodiment, a system for creating a list of related defects in a network environment includes a processor, and a computer readable storage medium having computer readable program code embodied therewith. The computer readable program code includes computer readable program code that, when executed by the processor, causes the system to acquire a device list related to devices in multiple paths of a network, computer readable program code that, when executed by the processor, causes the system to query one or more information sources using the device list to retrieve defect data from the one or more information sources, computer readable program code that, when executed by the processor, causes the system to create a list of related defects based on the retrieved defect data, and computer readable program code that, when executed by the processor, causes the system to output the list of related defects.

In another embodiment, a method for creating a list of related defects in a network environment includes acquiring a device list related to devices in multiple paths of a network, querying one or more information sources using the device list to retrieve defect data from the one or more information sources, creating a list of related defects based on the retrieved defect data, and outputting the list of related defects.

In another embodiment, a computer program product for creating a list of related defects in a network environment includes a computer readable storage medium having computer readable program code embodied therewith. The computer readable program code includes computer readable program code configured to acquire a device list related to devices in multiple paths of a network, computer readable program code configured to query one or more information sources using a device list to retrieve defect data from the one or more information sources, computer readable program code configured to create a list of related defects based on the retrieved defect data, and computer readable program code configured to output the list of related defects.

In yet another embodiment, a system for creating a list of related defects in a storage area network (SAN) environment includes a processor and a computer readable storage medium having computer readable program code embodied therewith. The computer readable program code includes computer readable program code that, when executed by the processor, causes the system to discover available paths in the SAN, computer readable program code that, when executed by the processor, causes the system to discover devices in the path for each of the available paths, computer readable program code that, when executed by the processor, causes the system gather data related to the device for each of the devices in each of the paths, computer readable program code that, when executed by the processor, causes the system to analyze the gathered data from each of the devices and each of the paths to form a device list, computer readable program code that, when executed by the processor, causes the system to query one or more information sources using the device list to retrieve, defect data, computer readable program code that, when executed by the processor, causes the system to create a list of related defects based on the retrieved defect data, and computer readable program code that, when executed by the processor, causes the system to output the list of related defects.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

When network environments are impacted by defects, debug analysis often results in determining that known defects caused the outage, failure, stoppage, etc., or other network problems. Currently, network administrators are often responsible for reading defect documentation and trying to understand the impacts such defects could cause in the network environment. The problem with this methodology is that with multiple code streams, it is extremely difficult to understand which paths potential defects could impact. Further, certain storage or host bus adaptor (HBA) devices may also include release notes warning users not to in the devices in combination with fabric code levels due to known high-impact defects.

The following description describes methods and systems for gathering device information to identify potential risks in a network environment, according to various embodiments. For example, in one approach, a method to gather and process switch device code levels traversed in a given path to compile a list of network devices and code versions and then compare this list to a system generated defect list or a pre-existing defect list identified per code version (which may also include HBA and/or storage defects specific to network levels) to point out or help identify any hazards, risks, and/or known defects that may affect the HBA, Storage, or other components including Fibre Channel switch modules (FCSMs) in a live operating environment. Once the list of paths potentially impacted by defects is generated, it may be summarized into a larger "network wide" table for review by a system administrator or another process, stored to computer readable memory, etc.

In one embodiment, the summarized version of defects specific to the operating environment is a huge improvement over current methods of wading through overwhelming amounts of documentation and trying to understand which defects possibly apply to a specific environment. Once the summary table is available, the system administrator may review line items and decide which defects are low impact and which may require prompt action and/or attention. It may further be possible for the system administrator to flag and categorize certain defects for later review or action. In an alternate embodiment, the system administrator may sort the table by defect, by network, by switch, etc., to look for dominant types of defects, problematic switches which might be replaced because they have a preponderance of errors, etc.

According to one general embodiment, a system for creating a list of related defects in a network environment includes a processor, and a computer readable storage medium having computer readable program code embodied therewith. The computer readable program code includes computer readable program code that, when executed by the processor, causes the system to acquire a device list related to devices in multiple paths of a network, computer readable program code that, when executed by the processor, causes the system to query one or more information sources using the device list to retrieve defect data from the one or more information sources, computer readable program code that, when executed by the processor, causes the system to create a list of related defects based on the retrieved defect data, and computer readable program code that, when executed by the processor, causes the system to output the list of related defects.

In another general embodiment, a method for creating a list of related defects M a network environment includes acquiring a device list related to devices in multiple paths of a network, querying one or more information sources using the device list, to retrieve defect data from the one or more information sources, creating a list of related defects based on the retrieved defect data, and outputting the list of related defects.

In another general embodiment, a computer program product for creating a list of related defects in a network environment includes a computer readable storage medium having computer readable program code embodied therewith. The computer readable program code includes computer readable program code configured to acquire a device list related to devices m multiple paths of a network, computer readable program code configured to query one or more information sources using a device list to retrieve defect data from the one or more information sources, computer readable program code configured to create a list of related defects based on the retrieved defect data, and computer readable program code configured to output the list of related defects.

In yet another general embodiment a system for creating a list of related defects in a storage area network (SAN) environment includes a processor and a computer readable storage medium having computer readable program code embodied therewith. The computer readable program code includes computer readable program code that, when executed by the processor, causes the system to discover available paths in the SAN, computer readable program code that, when executed by the processor, causes the system to discover devices in the path for each of the available paths, computer readable program code that, when executed by the processor, causes the system to gather data related to the device for each of the devices in each of the paths, computer readable program code that, when executed by the processor, causes the system to analyze the gathered data from each of the devices and each of the paths to form a device list, computer readable program code that, when executed by the processor, causes the system to query one or more information sources using the device list to retrieve defect data, computer readable program code that, when executed by the processor, causes the system to create a list of related defects based on the retrieved defect data, and computer readable program code that, when executed by the processor, causes the system to output the list of related defects.

As will be appreciated by one skilled in the art, aspects of the present invention may be embodied as a system, method and/or computer program product. Accordingly, aspects of the present invention may take the form of an entirely hardware embodiment, an entirely software embodiment(including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, as random access memory (RAM), a read-only memory (ROM), an erasable programmable read-only memory (EPROM or Flash memory), an optical fiber, a portable compact disc read-only memory (CD-ROM), a digital versatile disc read-only memory (DVD-ROM), a Blu-ray disc read-only memory (BD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or it connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a storage area network (SAN), etc., or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
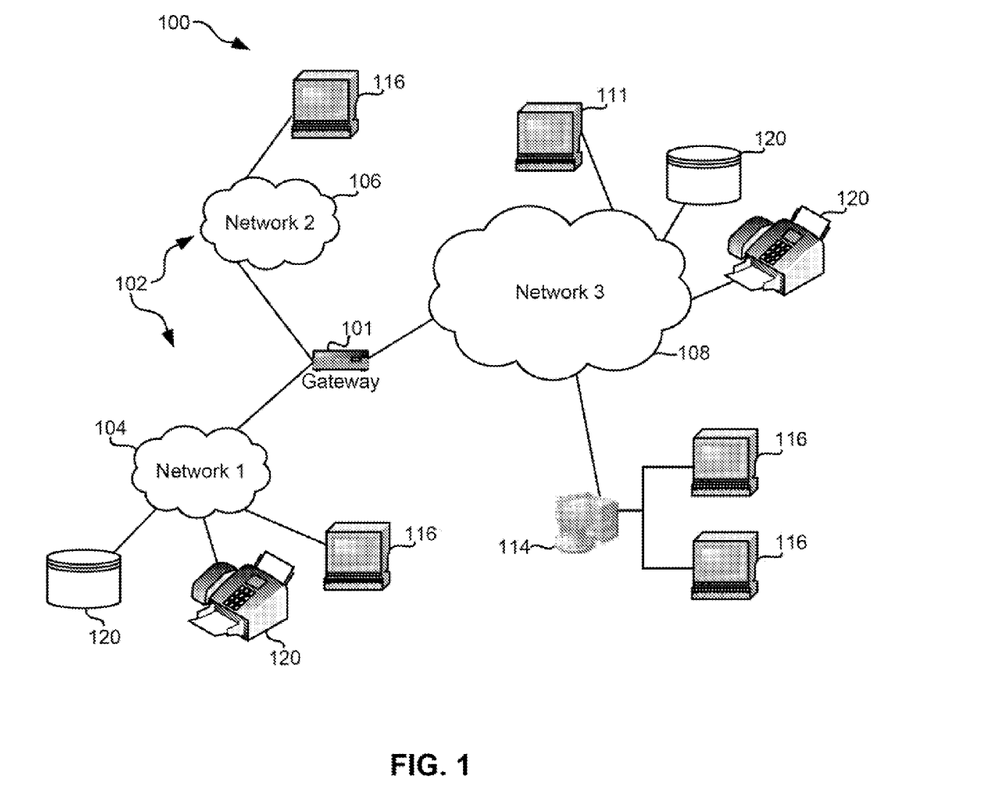
FIG. 1 illustrates a network architecture, in accordance with one embodiment.

FIG. 1 illustrates a network architecture 100, in accordance with one embodiment As shown in FIG. 11, a plurality of remote networks 1102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, a SAN, a PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network. In one embodiment, peripheral 120 may be an IBM Scaled Out Network Attached Storage SoNAS). In another embodiment, peripheral 120 may be an IBM System Storage TS7650 ProtecTIER Deduplication Appliance. In yet another embodiment, peripheral 120 may be an IBM System Storage TS3500 Tape Library.

According to some approaches, methods and systems described herein may be implemented with and/or on virtual system and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
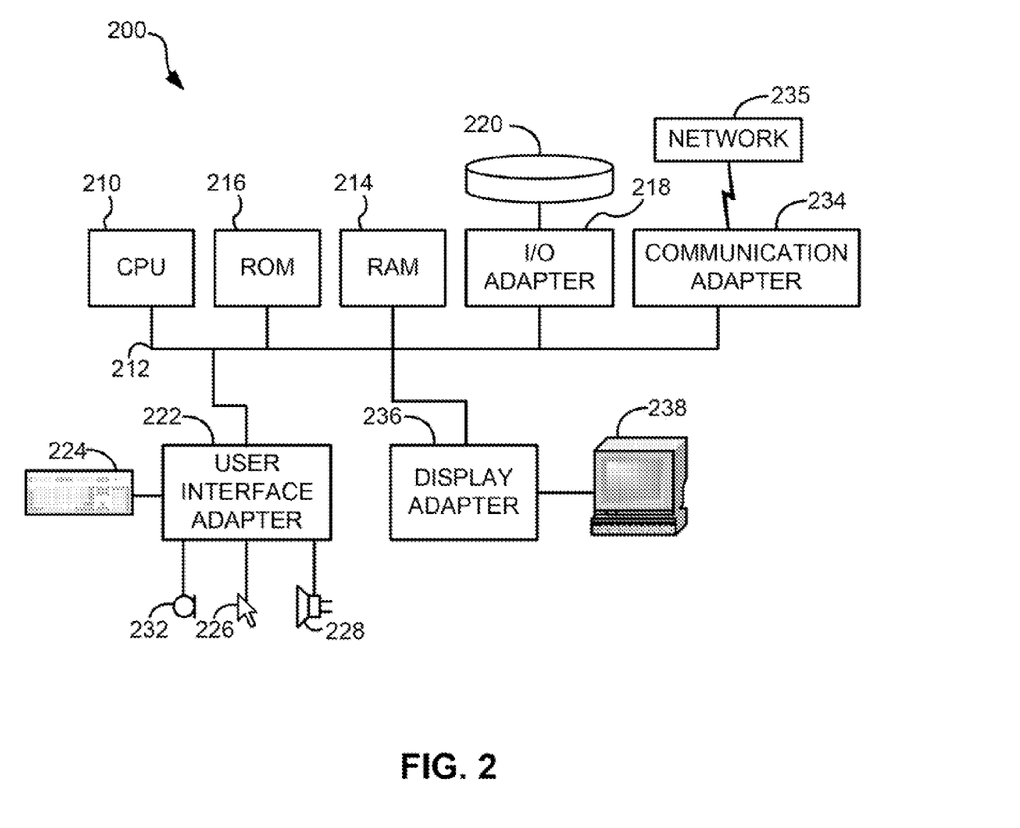
FIG. 2 shows a representative hardware environment that may be associated with the servers and/or clients of FIG. 1, in accordance with one embodiment.

FIG. 2 shows a representative hardware environment 200 associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera lot shown)

to the bus 212, communication adapter 234 for connecting the workstation to a communication network 235 (e.g., a data processing network) and a display adapter 236 for connecting the bus 212 to a display device 238. In various embodiments, communication adapter 234 may be chosen from any of the following types: Ethernet, Gigabit Ethernet, Fibre Channel (FC), Fibre Channel over Ethernet (FCoE), Small Computer System Interface (SCSI), Internet Small Computer System Interface (iSCSI), and the like.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become creasingly used to develop complex applications, may be used.

Figure 3:
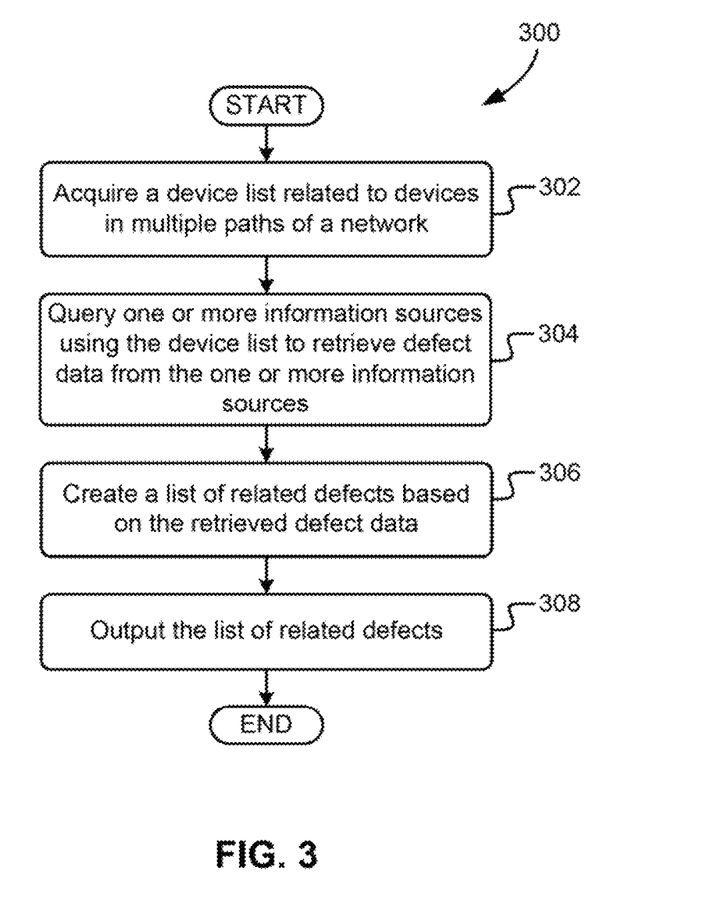
FIG. 3 is a flow diagram of a method for creating a list of related defects in a network environment, according to one embodiment.

Now referring to FIG. 3, a method 300 is shown for creating a list of related defects in a network environment, according to one embodiment. Of course, the method 300 may include more or fewer operations than those described below and shown in FIG. 3, as would be apparent to one of skill in the art upon reading the present descriptions. Also, the method 300 may be performed in any desired environment, and may involve systems, components, etc., as described in regard to FIGS. 1-2, among others.

The method 300 may be carried out on a network using any known protocol, such as Fibre Channel (FC) and/or FC over Ethernet (FCoE) protocols, according to preferred embodiments. In another embodiment, the method 300 may be executed on a host system, a device, a management switch, a management server, etc., or any other system, server, application, or device as would be apparent to one o skill in the art upon reading the present descriptions.

In various approaches, the method 300 may be carried out periodically on a network or system (such as every month, every two weeks, every other month, etc.), may be initiated manually or automatically in response to network changes, may be initiated due to an event, outage, failure, etc., or for any other reason as would become apparent to one of skill in the art upon reading the present disclosure.

In another approach, the method 300 may be preformed by a system and/or a computer program product.

In operation 302, a device list related to devices in multiple paths of a network is acquired. The device list may be acquired from any source, such as from devices in a network, from a server that has the device list and/or information related to devices in multiple paths of the network stored therein, from as system which has predetermined the data, etc.

In various embodiments, acquiring may include generating, obtaining, retrieving, discovering, etc., the device list from one or more sources and/or from data related to devices in the network.

In one approach, the device list may be created based on data that is stored on a server, system, memory, etc.

In another approach, the device list includes information and vendor code levels for each unique device vendor in each path of the network. Of course, other data may also be represented in the device list, and in some embodiments, the data may include data from devices other than switches.

In one embodiment, the device list may include unique vendor information (information for each vendor without repeating vendors), vendor code levels in each path to identify error codes, device model, etc.

According to one embodiment, acquiring the device list may include the following: discovering available paths, discovering devices in the path for each of the available paths, gathering data related to the device for each of the devices in each of the paths, and analyzing gathered data from each of the devices and each of the paths to form the device list.

In a further embodiment, discovering devices in the path may include issuing a fibre channel (FC) trace route command for the path. In another further embodiment, gathering data related to the device for each of the devices in each of the paths may include issuing a request node identification (RNID) command for the device.

In operation 304, one or more information sources is queried using the device list to retrieve defect data from the one or more information sources. The defect data retrieved may include model, vendor, code information, etc., in some approaches. In more approaches, the information sources may include a management server, a defect server, other servers, systems, and devices, etc.

Information sources may include servers, systems, databases, lists, the internet, websites, vendor device manuals, etc., or any other source which may include information relating the devices in paths of the network.

For example, a management server application programming interface (API) may be queried to retrieve a model, a code, vendor information, etc., for each device in the device list. If the device data has been gathered, and has been stored, then the management server API query may not be used and the gathered data may be queried instead.

In another example, a defect server may be queried to retrieve information related to code streams and vendors as retrieved from the management server API and/or the device list and/or the gathered data. The defect server may include data that relates to individual defects of each of the devices in each of the paths, as collected upon installation thereof, or queried from other sources (such as the internet, LAN, WAN, etc.) upon discovery thereof, in some approaches.

In one approach, the detect server could include information for an entire organization, for an entire network, for as portion of a network, etc. In another approach, the defect server may be updated (such as via script) periodically (such as each day, each night, every 12 hours, every week, etc.) from vendor publications, postings, etc., defect lists, or any other data as known in the art that includes known bugs/defects listed by vendor and code levels.

In operation 306, a list of related defects is created based on the retrieved defect data. The list of related defects may include possible defects, probability of defects, devices affected, model, vendor, code level, etc. Preferably, the list is presented in a manner which is understandable by a system administrator and/or by a system for interpreting the list of related defects.

In operation 308, the list of related defects is output. In one approach, the list may be output to a system administrator or some other user on a display, as a printout, as an interactive graphic, as data output to a storage device, etc. In another approach, the list of related defects may be output to a system as computer readable programming code, for interpretation thereof.

In one embodiment, the list of related defects may be sorted according to severity of the defect, likelihood of the defect happening, code stream, vendor, etc., and may include a dismiss option for skipping the defect.

In a related operation, the list of related defects may be used to determine most likely or probable defects which may affect devices in the network, portion of the network, etc.

In another embodiment, the list of related defects may be output to another network, such as a business adaptation of existing social networks (e.g., FACEBOOK, LINKED IN, TWITTER, etc.), an application (e.g., a database program, a compiler, a network fabric manager software, etc.), a system or server, etc. In one embodiment, the database may be an IBM DB2 database, which enables the defects to be sorted by defect type, defect frequency, most frequently encountered defects, defect severity, etc.

Figure 4:
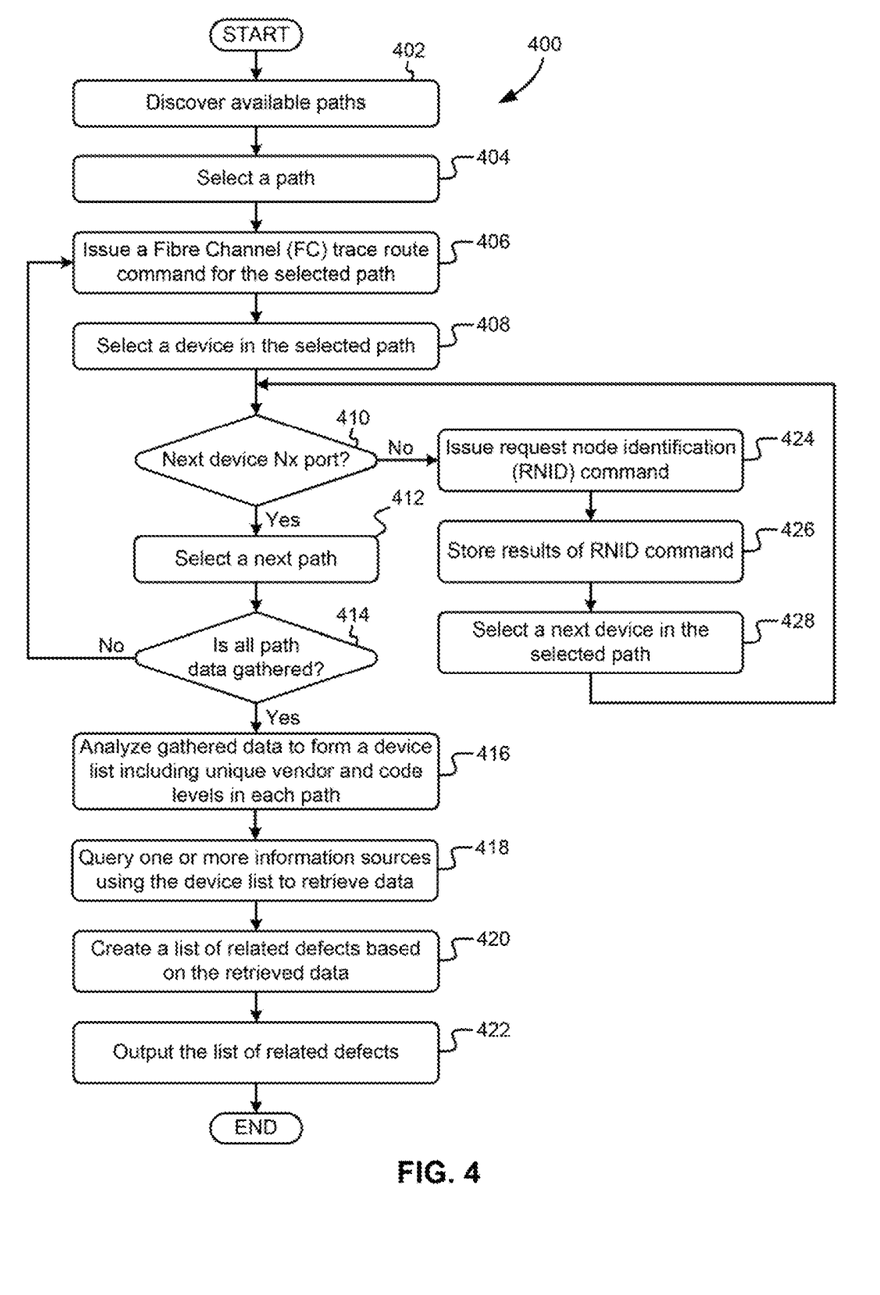
FIG. 4 is a flow diagram of a method for creating a list of related defects in a network environment, according to one embodiment.

Now referring to FIG. 4, a method 400 is shown for creating a list of related defects in a network environment, according to one embodiment. Of course, the method 400 may include more or fewer operations than those described below and shown in FIG. 4, as would be apparent to one of skill in the art upon reading the present descriptions. Also, the method 400 may be performed in any desired environment, and may involve systems, components, etc., as described in regard to FIGS. 1-3, among others.

The method 400 may be carried out on a network using any known protocol, such as Fibre Channel (FC) and/or FC over Ethernet (FCoE) protocols, according to preferred embodiments. In another embodiment, the method 400 may be executed on a host system, a device, a management switch, a management server, etc., or any other system, server, application, or device as would be apparent to one of skill in the art upon reading the present descriptions.

In various approaches, the method 400 ma be carried out periodically on a network or system (such as every month, every two weeks, every other month, etc.), may be initiated manually or automatically in response to network changes, may be initiated due to an event, outage, failure, etc., or for any other reason as would become apparent to one of skill in the art upon reading the present disclosure.

In another approach, the method 400 may be performed by a system and/or a computer program product.

Referring again to FIG. 4, in operation 402, available paths are discovered using conventional methods. The paths may be discovered on an entire network, such as a SAN or a LAN, a portion of a network, or based on an aspect of the path, such as functionality, purpose, usage, etc.

After the available paths are discovered, data may be gathered from each of the paths, such as information about devices in the path. The data that can be gathered, and the method of gathering that data, may be of any type known in the art. According to one embodiment, the method of gathering the data may be carried out as described in operations 404-414.

In operation 404, a path is selected. The selected path may be the first path of the available paths. In successive operations, the path selected may be the next path in the available paths, then the next path after that, and so on until all paths have been selected.

In operation 406, devices are discovered in the path, such as by issuing a FC trace route command for the selected path. Of course, any other command capable of discovering devices in a path may be used, as would be known to one of skill in the art.

The FC trace route command may be issued with the source frame equal to the selected device and the destination frame equal to the device which the N port plans on using, in one embodiment. The FC trace route command may provide a list of every device in the path from the source to the destination. In order to issue the link service in which the command may be issued, a domain ID is required. In order to obtain the domain ID, a switch may be emulated, or a new extended link service may be created that may be issued by an Nx port or the like, in some approaches. In another approach, the behavior of the FC trace route command may be modified to allow it to be issued by an Nx port or the like.

The types of devices that may be discovered include any type of device known in the art, such as an HBA, an internal or external FCSM, a FC forwarder (FCF), network switches (such as SAN switches, WAN switches, LAN switches, etc.), virtual ports (F, S, V, etc.), virtual devices, etc.

After the command is issued to discover devices in the path, data related to the device is gathered for each of the devices in the path. The data that can be gathered, and the method of gathering that data, may be of any type known in the art. In one approach, the data may be gathered from each of the devices in the path.

For example, in one approach, the devices may be identified and data related to the device may be collected from the device. Any type of data may be gathered such as the device's port name (N_Port_Name), the device's node name (Node_Name), the device's unique vendor name (Vendor_Unique), the device's physical port number, the switch for the device, the IP address of the device. etc.

According to one embodiment, the method of gathering the data may be carried out as described in operations 408, 410, 424, 426, and 428.

In operation 408, a device in the selected path is selected. The types of devices that may be selected have previously been described, and ma include virtual devices. The device may be the first device in the path, and in successive operations, the device selected may be the next device in the selected path.

In operation 410, it is determined if the next device in the selected path is a Nx port or the like, which signifies that the path has been exhausted of devices. If it is, the method 400 moves on the operation 412. If not, the method 400 moves to operation 424. In other operations, one or more different methods of determining if a path has been exhausted of devices may be used, as would be known to one of skill in the art.

In operation 424, a request node identification (RNID) command is issued for the selected device. Of course, any other command capable of gathering data from the device may be used, as would be known to one of skill in the art. Any type of data may be gathered such as the device's port name (N_Port_Name), the device's node name (Node_Name), the device's unique vendor name (Vendor_Unique), the device's physical port number, the switch for the device, the IP address of the device, etc.

In an alternate embodiment, a show version command may be issued to gather vendor, code level, and model information from all devices in the path.

In operation 426, results from the RNID command (or other command) are stored, such as to a memory of a server, system, etc., that is performing the method 400. Any type of memory or storage device may be used for storing the results. In one approach, results may be logged for easier interpretation thereof in a later operation.

In operation 428, a next device in the selected path is selected, and the process returns to operation 410 to begin gathering data from the next device.

Returning again to operation 410, if it is determined that the next device in the selected path is at Nx port (initiator or target port), which signifies that the path has been exhausted of devices, the process moves on to operation 412. Any other method as known in the art may be used to determine if all devices in the path have been exhausted.

In operation 412, a next path from the available paths is selected.

In operation 414, it is determined if all path data has been gathered, e.g., there are no further paths from which to gather data. If it has, then the process moves on to operation 416. If not, the method returns to operation 406 to gather data from the next selected path.

In operation 416, gathered data from each of the devices and each of the paths is analyzed to form a device list. In one approach, the device list includes information and/or vendor code levels for each unique device vendor in each of the paths or the like.

In one example, gathered data from each of the devices and each of the paths may be used to identify each unique device in the paths. Device name, IP address, and/or other uniquely identifying information may be used to identify the devices. Alternatively, a management server API or the like may be queried with domain identities to return device names and/or other uniquely identifying information.

Of course, other data may also be represented in the device list, and in some embodiments, the data may include data from switches only, from devices other than switches, from all devices, etc.

In one embodiment, the device list may include unique vendor information (information for each vendor without repeating vendors), vendor code levels in each path to identify error codes, device model, etc.

In operation 418, one or more information sources is queried using the device list to retrieve defect data. The defect data retrieved may include model, vendor, code information, etc., in some approaches. In more approaches, a management server and/or a defect server may be queried, among other possible servers, systems, and devices.

Information sources may include servers, systems, databases, lists, the internet, websites, vendor device manuals, etc., or any other source which may include information relating the devices in paths of the network.

For example, a management server application programming interface (API) may be queried to retrieve a model, a code, vendor information, etc., for each device in the device list. If the device data has been gathered from each of the devices in each of the paths, and has been stored, as in operation 426, then the management server API query may not be used and the gathered data may be queried instead.

In another example, a defect server may be queried to retrieve information related to code streams and vendors as retrieved from the management server API and/or the device list and/or the gathered data. The defect server may include data that relates to individual defects of each of the devices in each of the paths, as collected upon installation thereof, or queried from other sources (such as the internet, LAN, WAN, etc.) upon discovery thereof, in some approaches.

In one approach, the defect server could include information for an entire organization, for an entire network, for a portion of a network, etc. In another approach, the defect server may be updated (such as via script) periodically (such as each day, each night, every 12 hours, every week, etc.) from vendor publications, postings, etc., defect lists, or any other data as known in the art that includes known bugs/defects listed by vendor and code levels.

In operation 420, a list of related defects is created based on the retrieved defect data. The list of related defects may include possible defects, probability of defects, devices affected, model, vendor, code level, etc. Preferably, the list is presented in a manner which is understandable by a system administrator and/or by a system for interpreting the list of related defects.

In operation 422, the list of related defects is output. In one approach, the list may be output to a system administrator or some other user on a display, as a printout, as an interactive graphic, as data output to a storage device, etc. In another approach, the list of related defects may be output to a system as computer readable programming code, for interpretation thereof.

In one embodiment, the list of related defects may be sorted according to severity of the defect, likelihood of the defect happening, code stream, vendor, etc., and may include a dismiss option for skipping the defect.

In a related operation, the list of related defects may be used to determine most likely or probable detects which may affect devices in the network, portion of the network, etc.

In another embodiment, the list of related defects may be output to another network, such as a business adaptation of social networks (e.g., FACEBOOK, LINKED IN, TWITTER, etc.), an application e.g., a database program, a compiler, a network fabric manager software, etc.), a system or server, etc. In one embodiment, the database may be an IBM DB2 database, which enables the defects to be sorted by defect type, defect frequency, most frequently encountered defects, defect severity, etc.

In one embodiment, if the network fabric is known, then the method 400 may be expedited, and the operations for determining the structure of the network may be bypassed. For example, operations 402-414, 424, 426, and 428 may be bypassed if the network fabric is known.

In another embodiment, a computer program product for creating a defect list includes a computer readable storage medium having computer readable program code embodied therewith. The computer readable program code includes computer readable program code configured to discover available paths; computer readable program code configured to discover devices in the path for each of the available paths; computer readable program code configured to gather data related to the device for each of the devices in each of the paths; and computer readable program code configured to analyze gathered data from each of the devices and each of the paths to form the device list In one embodiment, this computer program product may be executable from a remote location to diagnose a local system, such as a service provider relationship to a customer site.

In one embodiment, a system may include a processor and a computer readable storage medium having computer readable program code embodied therewith. The computer readable program code may include computer readable program code that when executed by the processor, causes the system to query one or more servers using a device list to retrieve defect data; computer readable program code that when executed by the processor, causes the system to create a list of related defects based on the retrieved defect data; and computer readable program code that when executed by the processor, causes the system to output the list of related defects Of course, any of the above described embodiments ma be implemented in the system as would be understood by one of Skill in the art upon reading the present descriptions.

In another embodiment, a computer program product for creating a list of related defects in a network environment may include a computer readable storage medium having computer readable program code embodied therewith. The computer readable program code includes computer readable program code configured to query one or more servers using a device list to retrieve defect data; computer readable program code configured to create a list of related defects based on the retrieved defect data; and computer readable program code configured to output the list of related defects.

As previously described regarding FIGS. 3-4 and methods 300 and 400, several embodiments may also be included in the computer readable code, such as computer readable program code configured to discover available paths; computer readable program code configured to discover devices in the path for each of the available paths; computer readable program code configured to gather data related to the device for each of the devices in each of the paths; and computer readable program code configured to analyze gathered data from each of the devices and each of the paths to form the device list.

In more embodiments, the computer readable program code configured to discover devices in the path may include computer readable program code configured to issue a fibre channel (FC) trace route command for the path.

In another approach, the computer readable program code configured to gather data related to the device for each of the devices in each of the paths may include computer readable program code configured to issue a request node identification (RNID) command for the device.

According to another approach, the device list may include information and vendor code levels for each unique device vendor in each of the paths.

And in another approach, the list of related defects may include model, vendor, and vendor code levels for each unique device in each of the paths.

In one preferred embodiment, a system for creating a list of related defects in a SAN environment includes a processor (such as a CPU, field programmable gate array (FPGA), an application-specific integrated circuit (ASIC), etc.) and one or more computer readable storage media having computer readable program code embodied therewith. The computer readable program code may include computer readable program code that, when executed by the processor, causes the system to: discover available paths in the SAN, discover devices in the path for each of the available paths, gather data related to the device for each of the devices in each of the paths, analyze the gathered data from each of the devices and each of the paths to form a device list, query one or more information sources using the device list to retrieve defect data, create a list of related defects based on the retrieved defect data, and output the list of related defects.

Of course, any of the previously described approaches and embodiments may be implemented in this preferred embodiment.

In one such embodiment, the computer readable program code that, when executed by the processor, may further cause the system to: discover devices in the path comprises computer readable program code configured to issue a FC trace route command for the path, and gather data related to the device for each of the devices in each of the paths comprises computer readable program code configured to issue a RNID command for the device, Of course, the above practical applications are for illustration only. The present invention is not limited to any particular operating system or language, and may be designed for any environment and may include more or less functionality than that shown above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for creating a list of related defects in a network environment, the system comprising:
 a processor; and
 a computer readable storage medium having computer readable program code embodied therewith, the computer readable program code comprising:
  computer readable program code that, when executed by the processor, causes the system to acquire a device list related to devices in multiple paths of a network, the computer readable program code for acquiring a device list including computer readable program code that when executed by the processor causes the system to issue trace route commands for discovering devices in each of the paths, including computer readable program code configured to issue a fibre channel (FC) trace route command for at least one of the paths;
  computer readable program code that, when executed by the processor, causes the system to query one or more information sources using the device list to retrieve deflect data from the one or more information sources;
  computer readable program code that, when executed by the processor, causes the system to create a list of related defects based on the retrieved defect data; and
  computer readable program code that, when executed by the processor, causes the system to output the list of related defects.

2. The system as recited in claim 1, wherein the computer readable program code that, when executed by the processor, causes the system to acquire a device list comprises:
 computer readable program code that when executed by the processor, causes the system to discover the paths;
 computer readable program code that when executed by the processor, causes the system to gather data related to the device for each of the devices in each of the paths; and
 computer readable program code that when executed by the processor, causes the system to analyze gathered data from each of the devices and each of the paths to form the device list.

3. The system as recited in claim 2, wherein the trace route command includes a fibre channel (FC) trace route command for each of one or more of the paths.

4. The system as recited in claim 2, wherein the computer readable program code that when executed by the processor, causes the system to gather data related to the device for each of the devices in each of the paths comprises computer readable program code configured to issue a request node identification (RNID) command for the device.

5. The system as recited in claim 1, wherein the device list includes information and vendor code levels for each unique device vendor in each of the paths.

6. The system as recited in claim 1, wherein the list of related defects includes model, vendor, and vendor code levels for each unique device in each of the paths.

7. A method creating a list of related defects in a network environment, the method comprising:
 acquiring a device list related to devices in multiple paths of a network, the acquiring a device list including issuing trace route commands for discovering devices in each of the paths, including issuing a fibre channel (FC) trace route command for at least one of the paths;
 querying one or more information sources using the device list to retrieve defect data from the one or more information sources;

creating a list of related defects based on the retrieved defect data; and outputting the list of related defects.

8. The method as recited in claim 7, wherein the acquiring a device list further comprises:

discovering the paths;

gathering data related to the device for each of the devices in each of the paths; and analyzing gathered data from each of the devices and each of the paths to form the device list.

9. The method as recited in claim 8, wherein the trace route command includes a fibre channel (IV) trace route command for each of one or more of the paths.

10. The method as recited in claim 8, wherein gathering data related to the device for each of the devices in each of the paths comprises issuing a request node identification (RNID) command for the device.

11. The method as recited in claim 7, wherein the device list includes information and vendor code levels for each unique device vendor in each of the paths.

12. The method as recited in claim 7, wherein the list of related defects includes model, vendor, and vendor code levels for each unique device in each of the paths.

13. A computer program product for creating a list of related defects in a network environment, comprising:

a computer readable storage medium having computer readable program code embodied therewith, the computer readable program code comprising:

computer readable program code configured to acquire a device list related to devices in multiple paths of a network, including computer readable program code configured to issue a fibre channel (FC) trace route command for at least one of the paths;

computer readable program code configured to query one or more information sources using a device list to retrieve defect data from the one or more information sources;

computer readable program code configured to create a list of related defects based on the retrieved defect data; and computer readable program code configured to output the list of related defects.

14. The computer program product as recited in claim 13, wherein the computer readable program code configured to acquire a device list comprises:

computer readable program code configured to discover available paths;

computer readable program code configured to discover devices in the path for each of the available paths;

computer readable program code configured to gather data related to the device for each of the devices in each of the paths; and computer readable program code configured to analyze gathered data from each of the devices and each of the paths to form the device list.

15. The computer program product as recited in claim 14, wherein the computer readable program code configured to discover devices in the path comprises the computer readable program code configured to issue the FC trace route command for the path.

16. The computer program product as recited in claim 14, wherein the computer readable program code configured to gather data related to the device for each of the devices in each of the paths comprises computer readable program code configured to issue a request node identification (RNID) command for the device.

17. The computer program product as recited in claim 13, wherein the device list includes information and vendor code levels for each unique device vendor in each of the paths.

18. The computer program product as recited in claim 13, wherein the list of related defects includes model, vendor, and vendor code levels for each unique device in each of the paths.

19. A system for creating a list of related defects in a storage area network (SAN) environment, the system comprising:

a processor; and a computer readable storage medium having computer readable program code embodied therewith, the computer readable program code comprising:

computer readable program code that, when executed by the processor, causes the system to discover available paths in the SAN;

computer readable program code that, when executed by the processor, causes the system to discover devices in the path for each of the available paths by issuing trace route commands for discovering devices in each of the available paths, including computer readable program code configured to issue a fibre channel (FC) trace route command for at least one of the paths;

computer readable program code that, when executed by the processor, causes the system to gather data related to the device for each of the devices in each of the paths;

computer readable program code that, when executed by the processor, causes the system to analyze the gathered data from each of the devices and each of the paths to forma device list;

computer readable program code that, when executed by the processor, causes the system to query one or more information sources using the device list to retrieve defect data computer readable program code that, when executed by the processor, causes the system to create a list of related defects based on the retrieved defect data; and computer readable program code that, when executed by the processor, causes the system to output the list of related defects.

20. The system as recited in claim 19, wherein the computer readable program code that, when executed by the processor, causes the system to discover devices in the path comprises computer readable program code configured to issue a fibre channel (FC) trace route command for the path, and wherein the computer readable program code that, when executed by the processor, causes the system to gather data related to the device for each of the devices in each of the paths comprises computer readable program code configured to issue a request node identification (RNID) command for the device.

* * * * *